(No Model.)
F. MEINZER.
HAWSER GUIDE.
No. 458,855. Patented Sept. 1, 1891.
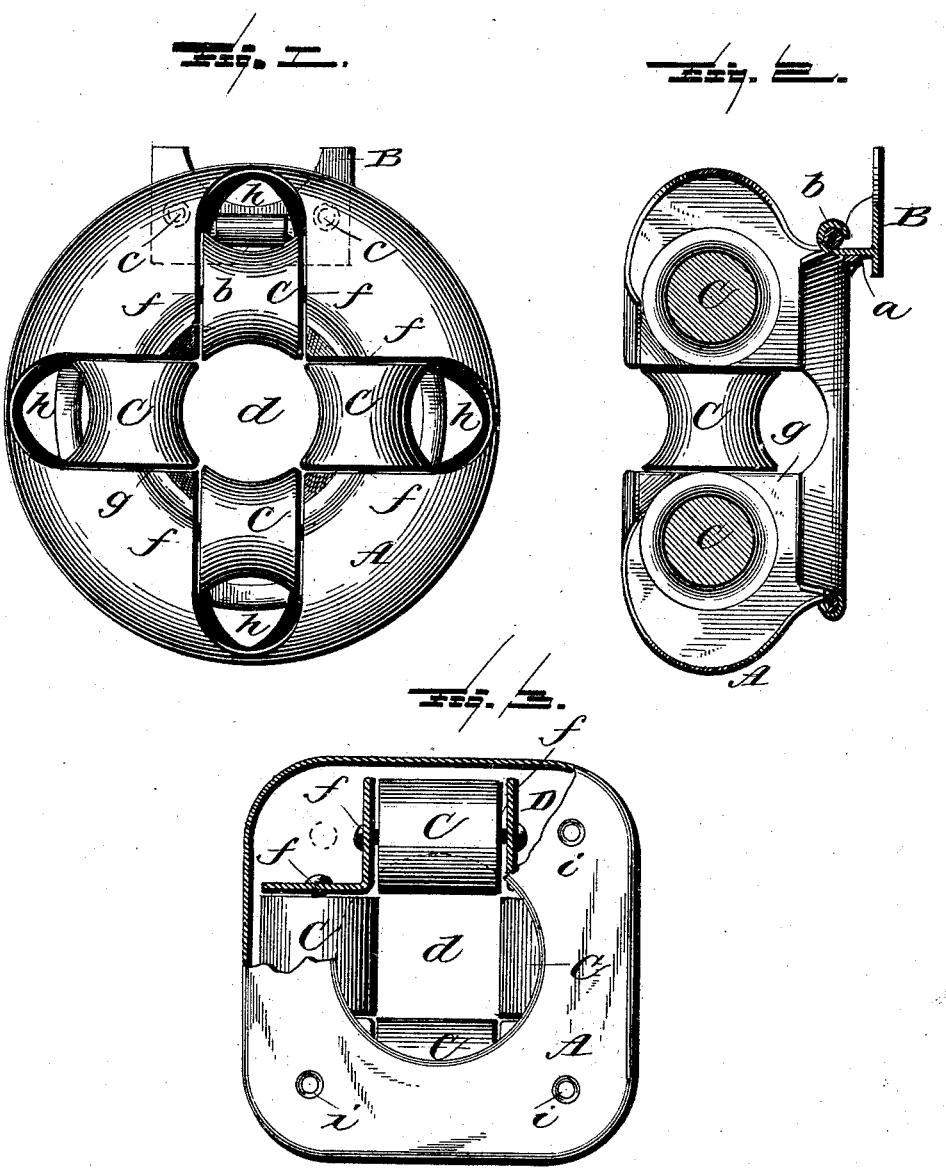
Witnesses
L. C. Hills.
E. H. Bond
Inventor:
Fred Meinzer,
E. B. Stocking.
Attorney

UNITED STATES PATENT OFFICE.

FRED. MEINZER, OF CLEVELAND, OHIO.

HAWSER-GUIDE.

SPECIFICATION forming part of Letters Patent No. 458,855, dated September 1, 1891.

Application filed March 3, 1891. Serial No. 383,544. (No model.)

*To all whom it may concern:*

Be it known that I, FRED. MEINZER, a citizen of the United States, residing at Cleveland, in the county of Cuyahoga, State of Ohio, have invented certain new and useful Improvements in Hawser-Guides, of which the following is a specification, reference being had therein to the accompanying drawings.

This invention relates to certain new and useful improvements in hawser guides or support over which the hawser or line may pass to prevent binding of the same and permit of its being readily unwound or wound up when desired.

The device is applicable to various uses—for heavy hawsers or for smaller lines, such as clothes-lines—being made heavy or light, according to the use for which it is to be put. I provide a support in which there are journaled a plurality of rollers, upon which the line is guided, the said rollers being so arranged that the line can assume no position but that it will be in contact with one or the other of the rollers. The device may be affixed in position in any suitable manner. The rollers may be grooved or not and they may be arranged so that the line may be passed around any one or more, as desired.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a face view of my improved guide. Fig. 2 is a central section through the same on the line $w$ $w$ of Fig. 1. Fig. 3 is a face view of a slightly-modified form with portions broken away and parts in section.

Like letters of reference indicate like parts in the several views where they occur.

Referring now to the details of the drawings by letter, A designates a support, which may be of any desired shape, circular or square, or of other form and of a material suited to the purpose for which it is to be used. For light lines I have found sheet metal to be sufficiently strong. When made circular, which is the preferable form, the support or frame A is of substantially a semicircle in cross-section, as seen in Fig. 2, and is provided with a bracket B, which is connected thereto in such a manner as to allow of some movement of the frame. In Fig. 2 I have shown this bracket as connected to the support by a lateral portion $q$, which is curled around a bar or portion $b$ of the support, acting somewhat like a hinge, as will be readily understood from Fig. 2. This bracket is designed to be affixed in the desired position in any suitable manner—as, for instance, by screws, nails, or other means, which may pass through holes $c$ therein, which are indicated by dotted lines in Fig. 1. This frame is provided centrally with an opening $d$, which is surrounded by the rollers C, which are provided with suitable pintles $f$, which are journaled in the walls $g$ of the frame or support A, each being arranged at right angles to its neighbor, as seen in Fig. 1. If desired, a space $h$ may be provided upon the outer edge opposite each roller, as seen in Fig. 1, so that, if desired, more than one line or rope may be used by causing the same to pass around the roller, one portion of the rope or line passing through said space $h$, as will be readily understood from Figs. 1 and 2. The rollers in the form shown in Figs. 1 and 2 are grooved, though not necessarily so.

In Fig. 3 is shown a modified form in which the frame or support A is square and the rollers C have their pintles held in L-shaped pieces D, depending from the top or cover of the support. The principle is the same in both forms and the operation is also practically the same. The square support is affixed in position by means passed through the holes $i$ therein.

What I claim as new is—

1. The combination, with the support having central opening, of the rollers journaled in the support around the opening at right angles to each other and having a space opposite the rollers at the outer edge thereof, the said support inclosing the rollers beyond said space, substantially as specified.

2. The combination, with the support A, having central opening for the passage of the line, of the grooved rollers journaled in the support around the said opening and at right angles to each other, with a space at the outer edge of each roller and a bracket hinged to said support, substantially as and for the purpose specified.

In testimony whereof I affix my signature in presence of two witnesses.

FRED. MEINZER.

Witnesses:
  HENRY GOLDSMITH,
  M. NEWMAN.